United States Patent [19]

Sedlmayr et al.

[11] Patent Number: 5,224,736
[45] Date of Patent: Jul. 6, 1993

[54] SAFETY BELT ARRANGEMENT FOR OCCUPANTS OF LAND VEHICLES AND AIRCRAFT

[75] Inventors: Andreas Sedlmayr, Hamburg; Herbert Just, Hohnstorf, both of Fed. Rep. of Germany

[73] Assignee: Autoflug GmbH & Co., Rellingen, Fed. Rep. of Germany

[21] Appl. No.: 821,237

[22] Filed: Jan. 10, 1992

Related U.S. Application Data

[63] Continuation-in-part of Ser. No. 478,095, Feb. 9, 1990, abandoned.

[30] Foreign Application Priority Data

Feb. 10, 1989 [DE] Fed. Rep. of Germany ....... 3903924
Feb. 10, 1989 [DE] Fed. Rep. of Germany ....... 3903925

[51] Int. Cl.⁵ ................................................ B60R 22/36
[52] U.S. Cl. .................................. 280/807; 244/122 B
[58] Field of Search .......................... 280/807, 808; 242/107.4 A; 297/478, 488, 477; 244/122 B, 122 AG; 180/268, 282

[56] References Cited

U.S. PATENT DOCUMENTS

| | | | |
|---|---|---|---|
| 3,918,545 | 11/1975 | Andres et al. | 244/122 B X |
| 4,570,872 | 2/1986 | Tsujimura et al. | 280/807 |
| 4,615,540 | 10/1986 | Sedlmayr et al. | 280/806 |
| 4,726,540 | 2/1988 | Ches et al. | 280/806 |
| 4,771,854 | 9/1988 | Syrowik | 180/268 |
| 4,796,918 | 1/1989 | Meyer et al. | 280/806 |
| 4,807,715 | 2/1989 | Nagashima et al. | 280/807 |
| 4,834,425 | 5/1989 | Kawai | 280/804 |
| 5,068,793 | 11/1991 | Condne et al. | 280/735 X |

FOREIGN PATENT DOCUMENTS

| | | | |
|---|---|---|---|
| 2246296 | 3/1974 | Fed. Rep. of Germany | 180/268 |
| 2751821 | 10/1978 | Fed. Rep. of Germany | 180/268 |

*Primary Examiner*—Tamara L. Graysay
*Attorney, Agent, or Firm*—Robert W. Becker & Associates

[57] ABSTRACT

A safety belt arrangement, for use in land vehicles or aircraft for securing the occupants thereof, has at least one belt reeling device with a self-locking blocking mechanism with a mechanical control for moving a locking member into the blocking position which prevents the belt from being pulled out further. In order to reduce the response times for the belt reeling devices, a computer is provided which determines the acceleration characteristics of the particular vehicle or aircraft and is coupled to the mechanical control of the belt reeling device, the locking member being moved into its blocking position or returned to its rest position by the mechanical control in response to a signal emitted by the computer.

6 Claims, 5 Drawing Sheets

SAFETY BELT ARRANGEMENT FOR OCCUPANTS OF LAND VEHICLES AND AIRCRAFT

This application is a continuation-in-part of application Ser. No. 478,095 filed Feb. 9, 1990, abandoned.

BACKGROUND OF THE INVENTION

The present invention relates to a safety belt arrangement, for use in land vehicles or aircraft for securing the occupants thereof, having at least one belt reeling device with a self-locking blocking mechanism with mechanical control means for moving a locking member into the blocking position which prevents the belt from being pulled out further.

As is well known, safety belt arrangements for the occupants of land vehicles and aircraft make use of safety belt reeling devices which prevent the belt from being pulled out further in the event of actuation. In order to control a movably mounted locking member in the blocking position thereof, the belt reeling devices have mechanical control means which respond both when the belt is pulled out too quickly and when acceleration or deceleration occurs which exceeds a limit set by the manufacturer, thus moving the locking member into its blocking position. The operating principle of a belt reeling device of this kind is described, for example, in U.S. Pat. No. 4,615,540, Sedlmayr et al, for use in motor vehicles. However, in terms of the operating principle, there is no fundamental difference between belt reeling devices for motor vehicles and those for aircraft.

A safety belt arrangement of this kind has the disadvantage that the mechanical control means of the belt reeling device in question can only ever respond after certain movements have been performed by the strapped-in occupant of the vehicle or by the vehicle itself, which means that there is necessarily a time delay between the moment of the cause of the emergency and the prevention of further withdrawal of the belt, with the consequence that before reaching their blocking position the belt reeling devices will still release some belt, so that the strapped-in occupant of the vehicle can be subjected to a forward movement.

In safety belt arrangements for aircraft, in particular, there is the problem that negative acceleration, such as may occur when the aircraft suddenly drops, cannot be detected by the mechanical control means of conventional belt reeling devices.

It is an object of the present invention to do away with a response time caused by the system in a safety belt arrangement of the kind mentioned above and thus further improve the safety of the strapped-in occupant.

BRIEF DESCRIPTION OF THE DRAWING

This object, and other objects and advantages of the present invention, will appear more clearly from the following specification in conjunction with the accompanying schematic drawings in which.

SUMMARY OF THE INVENTION

The safety belt arrangement of the present invention, for use in land vehicles and aircraft for securing the occupants thereof, is primarily characterized by an on-board computer provided for determining acceleration and deceleration forces of the vehicle or aircraft by calculating these acceleration and deceleration forces by taking values based on operating commands, so that for movements of the vehicle and aircraft initiated by an operator the acceleration and deceleration forces are calculated before actually occurring and can be used as measurements for controlling the self-locking blocking mechanism, where by the on-board computer is coupled to the control means of the belt reeling device, the control means activating the blocking position and returning the blocking mechanism to a rest position in response to a signal produced by the on-board computer based on the measurements.

According to the invention there is provided a safety belt arrangement, for use in land vehicles or aircraft for securing the occupants thereof, having at least one belt reeling device with a self-locking blocking mechanism with mechanical control means for moving a locking member into the blocking position which prevents the belt from being pulled out further, wherein a computer is provided which determines the acceleration characteristics of the particular vehicle or aircraft and is coupled to the mechanical control means of the belt reeling device, and wherein the locking member is arranged to be moved into its blocking position or returned to its rest position by the mechanical control means in response to a signal produced by the computer. The computer referred to herein is a commonly used on-board computer such as a known on-board flight computer in aircraft or an on-board vehicle computer in cars and trucks used to compute fuel consumption etc.

During operation of a preferred form of the invention, the computer determines the acceleration characteristics of the vehicle in question and, in addition to the acceleration conditions which actually occur, calculates beforehand the acceleration characteristics which can be expected by taking values based on the driving or flying commands, so that particularly for the movements of the vehicle which are initiated by the driver or pilot himself, the physical conditions occurring can be calculated beforehand and can be used as reference measurements. This applies particularly to the forces of acceleration or deceleration that act on the vehicle occupants and their safety belt arrangements; the levels of these forces can then be determined beforehand, i.e. before the movement has occurred. These data, which are then stored in the computer, can be used to block the belt reeling devices provided in the safety belt arrangements in the vehicle right at the start of the accelerations or decelerations that occur, depending on the values calculated beforehand, i.e. to move the locking members into the blocking position, so that when the corresponding acceleration or deceleration subsequently occurs the belt reeling devices are already in a position which prevents further withdrawal of the belt and thus does not allow any belt to be released at the moment when the vehicle movements take place. In order to achieve this advantageous effect it is envisaged that the mechanical control means of the belt reeling device should be coupled to the computer of the vehicle, and in response to a signal emitted by the computer the locking member of the belt reeling device, or the belt reeling device itself, is moved into the blocking position or returned to the rest position. As a result, the movement of unwinding or winding of the belt on the belt winding spindle itself is no longer needed in order to adjust the blocking position of the locking member.

The on-board computer, which serves to determine the acceleration and deceleration forces before these forces actually occur in order to preventively secure a person using the safety belt arrangement, may be connected, for example, to the accelerator of a motor vehicle or to the fuel supply line or the fuel pump of the motor vehicle so that when, for example, the accelerator is actuated, the resulting fuel supply value is submitted to the on-board computer as the input signal. The on-board computer may also be connected to the brake pedal, respectively, to the brake system of the motor vehicle so that the braking pressure generated within the brake system may also be submitted to the on-board computer as an input signal. Accordingly, when the driver or operator activates the accelerator or the brake pedal, the on-board computer computes the acceleration forces or deceleration forces which will result from the given commands before the motor vehicle itself is able to react to the actuation of the accelerator or brake pedal and actually undergoes the respective acceleration or deceleration. When the pre-computed acceleration and deceleration forces exceed given limits stored in the on-board computer, the on-board computer emits a signal for the actuation of the blocking mechanism of the coordinated safety belt reeling device. Thus, a preventive blocking of the safety belt reeling device takes place, and when the acceleration and deceleration forces which have been precalculated by the on-board computer actually take effect the safety belt reeling device is already blocked.

A further example for the use of such input signals and the precalculation of critical values can be found in radar systems for motor vehicles with which the distance to a vehicle driving in front of the motor vehicles is constantly measured. These radar systems have sensors that detect the distance to a vehicle in front, and the driver is acoustically or visually warned when the distance is below a certain safety limit. Furthermore, the results of the distance detection may be used in conjunction with an on-board computer according to the invention such that the on-board computer, when the distance is rapidly reduced (indicating a crash), is programmed to lock the safety belt system before the crash actually occurs.

On-board computers have long been used in aviation technology and their function and use is common knowledge to a person skilled in the art. Such a flight computer calculates, based on the flight commands given by the pilot (i.e., adjustments of the position of the wing flaps or rudder, thrust throttling or thrust acceleration of the engines, etc.), the resulting movement of the aircraft, respectively, the resulting load in the form of the so-called g-force, whereby the computation result is available before the actual load on the aircraft occurs.

Thus, the computation results can be used for preventively blocking the safety belt reeling devices for securing the buckled-in passengers.

In view of the above described object and function of the present invention, the design and construction of a respective on-board computer may be carried out by a person skilled in the art without difficulties, since the required programming, switching and connecting of the on-board computer lies well within the technical expertise of such a person.

In a preferred embodiment of the present invention the safety belt arrangement further comprises a servo-member, a signal line, and a flexible spindle having a lever connected thereto. The signal line connects the on-board computer to the servo-member and the spindle is connected to the servo-member, whereby the servo-member turns the spindle in response to a signal produced by the on-board computer thereby pivoting the lever into engagement with the self-locking blocking mechanism to reach the blocking position.

According to a preferred embodiment of the invention, the mechanical control means of the belt reeling device comprise an electromagnet which actuates the locking member between its rest position and its locking position: this electromagnet is connected to the computer via a signal line so that, above a fixed level for the acceleration or deceleration expected, the computer activates the magnet which in turn moves the locking member into the locking position or, in response to an all-clear signal emitted by the vehicle computer, releases the blocking of the belt reeling device, so that the vehicle occupant can move freely in terms of making his normal movements in the vehicle.

Alternatively, the mechanical control means of the belt reeling device may have an associated lever which actuates the locking member, this lever in turn being connected via a mechanical spindle to a servo-member which can be operated by the computer. The lever may act either directly or indirectly on the locking member so as to bring it into the looking position or return it. If the lever is indirectly coupled to the locking member, the lever blocks the mechanical control means of the belt reeling device so that even slight withdrawal of the belt will immediately cause the locking member to be deflected into the locking position, or the cessation of pull on the belt will release the blocking in response to the mechanical spring means provided at the belt reeling device end.

If a land vehicle or aircraft can be provided with a plurality of safety belt arrangements, each having a plurality of safety belt reeling devices provided therein and operating, the individual safety belt reeling devices in the vehicle may operate independently of one another and each may be independently connected to the computer; alternatively, the belt reeling devices may be connected to one another by means of a transmission element which controls all the locking members, this transmission element being movable via a servo-member controlled by the vehicle computer.

When used in an aircraft, the mechanical control means of the belt reeling device may be connected to the flight computer of the aircraft which measures and calculates all the data connected with the flight movements of the aircraft during flight, so that, in particular when flying maneuvers are preformed by the pilot himself, the physical conditions which occur during these maneuvers are calculated beforehand and are used to control the locking member of the belt reeling device.

If the safety belt arrangement is used in a motor car, a vehicle computer may be provided which calculates the acceleration characteristics of the vehicle on the basis of the movements of the vehicle controlled by the driver, for example analogously to the actuation of the accelerator and brake pedals, before the movements take place, and the computer accordingly emits the signals to command the locking member to be moved into the locking or rest position.

Finally, if the safety belt arrangement also comprises a body restraining device (tightening mechanism) and/or a clamping mechanism, it may also include the coupling of an actuating element for the tightening mechanism or clamping mechanism either separately or together, to the vehicle computer, with the actuation thresholds for the blocking of the belt reeling device and the actuation of the tightening mechanism or clamping mechanism being set at different levels.

The invention may be applied, for example, to a safety belt reeling device known from U.S. Pat. No. 4,618,108 in which a tightening mechanism acts on a shaft of the reeling device. The tightening mechanism is comprised of a drive cable and a cable pulley about which the drive cable is guided. When the belt reeling device is actuated, the shaft of the reeling device engages the cable pulley. The drive cable is connected to a pyrotechnical propellant charge disposed in a piston accommodated in a cylinder. The present invention may be applied to the known safety belt reeling device of U.S. Pat. No. 4,618,108 such that the on-board computer is connected to the ignition device for the pyrotechnical propellant charge. The propellant charge is ignited by a signal emitted from the on-board computer so that the piston pulls the drive cable, rotates the shaft of the reeling device, and tightens the safety belt. Accordingly, the tightening movement is complete before the acceleration and deceleration forces which have been precalculated by the on-board computer actually occur.

From U.S. Pat. No. 4,615,540 a safety belt reeling device is known in which a clamping mechanism for the safety belt is disclosed. The clamping mechanism is comprised of a clamping jaw arrangement which is actuated by a pyrotechnical propellant charge. A first clamping jaw is forced against a stationary second clamping jaw when the propellant charge is ignited and thereby clamps the safety belt between the two jams and a further release of the safety belt is prevented. The present invention may be applied to the aforementioned safety belt reeling device of U.S. Pat. No. 4,615,540 by connecting the on-board computer to the ignition device for the pyrotechnical propellant charge, and upon a signal emitted by the on-board computer the propellant charge is ignited so that the pivotable clamping jaw is pressed against the stationary clamping jaw thereby clamping the safety belt tightly. Accordingly, the clamping action is complete before the acceleration and deceleration forces, which have been precalculated by the on-board computer, actually occur.

DESCRIPTION OF PREFERRED EMBODIMENTS

The present invention will now be described in detail with the aid of several specific embodiments utilizing FIGS. 1 to 5.

Figure 1:
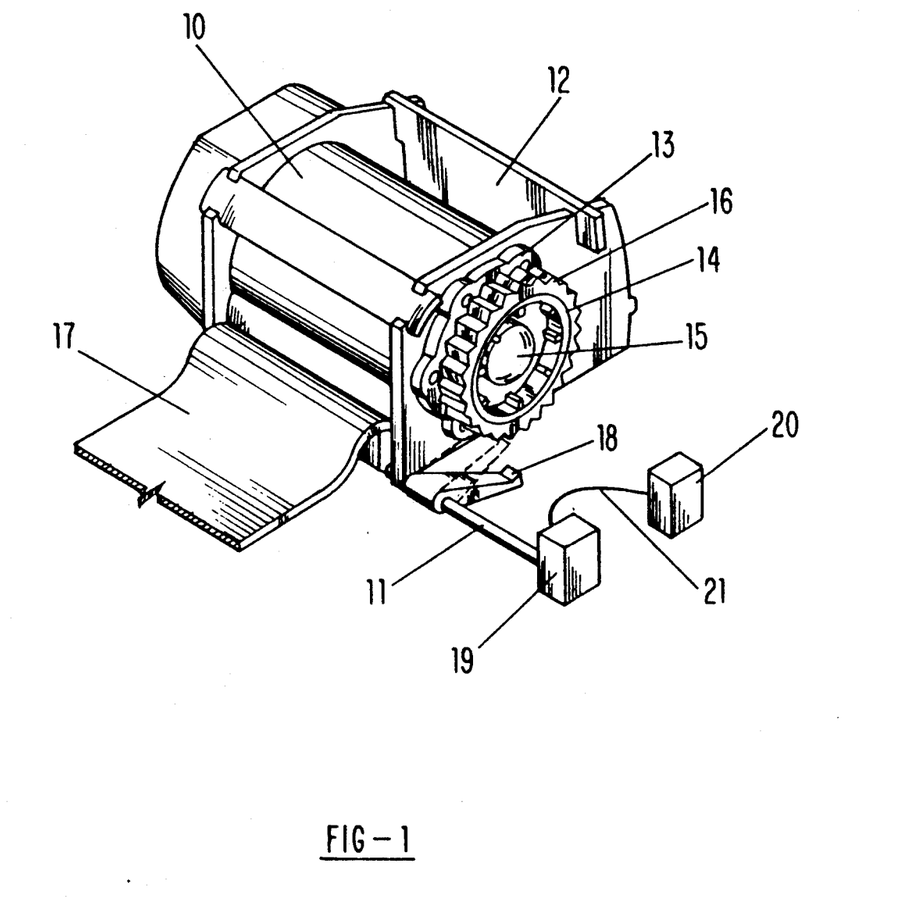
FIG. 1 is a diagrammatic view of one exemplary embodiment of the inventive belt reeling device coupled to a servo-member that is connected to a vehicle computer; in this embodiment, the locking member is controlled indirectly via a lever which can be described as part of the blocking mechanism

Referring now to the drawings in detail, the illustrated belt reeling device 10 operates in the same way as any such device according to the prior art and according to the radial blocking principle, which is therefore not part of the present invention, according to which a locking member which is connected in a form-locking manner to the belt winding spindle of the belt winding or reeling device 10 is urged radially into the inner teeth of a thrust ring 13 connected to the housing 12 of the belt reeling device, via a control means control system which is belt-sensitive and/or responds to acceleration or deceleration of the belt reeling device itself. Part of the control system is a control disk 14 which is acted upon, with respect to the beltsensitive control, by a G-value spring 15, and is provided with external teeth 16 in order to interact with a sensor (not shown) which detects acceleration or deceleration affecting the belt reeling device. Any stoppage of the control disk 14, which rotates with the belt winding spindle during normal operation of the belt reeling device 10, will lead to the radial deflection of the locking member and ensure that no further belt 17 is withdrawn from the belt reeling device 10, in a manner known per se. A lever 18 is also mounted on a rotatable spindle 11 in the plane of the control system 14, this lever having a pivot range such that in the event of actuation the lever 18 will engage in the external teeth 16 of the control disk 14 of the belt reeling device 10, and in its rest position releases the control disk 14 to allow it to rotate with the belt winding spindle of the belt reeling device 10.

The rotatable spindle 11 is connected at its free end to a servo-member 19 which is connected via a signal line 21 to the vehicle computer 20 of the vehicle in question. The servo-member 19 has mechanical means which cause the spindle 11 to rotate either clockwise or counterclockwise, in response to a signal received from the computer 20.

If, as a result of the driving or flying commands given by the driver or pilot, an acceleration is calculated beforehand in the computer 20 in which accelerations or decelerations above the permitted threshold will affect the body of the occupant and hence the belt reeling device, a signal to this effect is sent from the vehicle computer 20 through the signal line 21 to the servo-member 19, which then rotates the spindle 11 in a counterclockwise direction so that the lever 18 engages in the external teeth 16 on the control disk 14.

With the indirect coupling of the mechanical control means to the locking member which occurs in this embodiment just a slight withdrawal of the belt, with the control disk 14 locked in position is sufficient to cause the control member to be deflected in a known manner as a result of the relative movement between the belt winding spindle and the control disk, so that even if no belt is actually pulled out with the lever 18 pivoted inwards the belt reeling device 10 is automatically moved into the blocked position, without the vehicle occupant being aware of this as a result of any actual acceleration or deceleration.

Once the situation concerning the vehicle has come to an end, the servo-member 19 pivots the spindle 11 back in a clockwise direction, in response to an appropriate signal from the vehicle computer 20, with the result that the lever 18 releases the control disk 14 and no longer prevents the belt from being pulled out.

Although not shown in detail, the spindle 11a may be flexible and connected to a plurality of belt reeling devices arranged in a plurality of safety belt arrangements in the vehicle and, as it rotates, it may correspondingly block the mechanical control means of the other belt reeling means connected thereto, by means of correspondingly mounted levers.

The scope of the invention also includes arrangements in which a lever corresponding to the lever 18 acts directly on the locking member which is movable at the belt reeling end. According to a variant of the invention, instead of the mechanical levers it is possible to have electromagnets, for example, acting on the locking member, these electromagnets being excited or controlled by appropriate signals from the vehicle computer 20.

Figure 2:
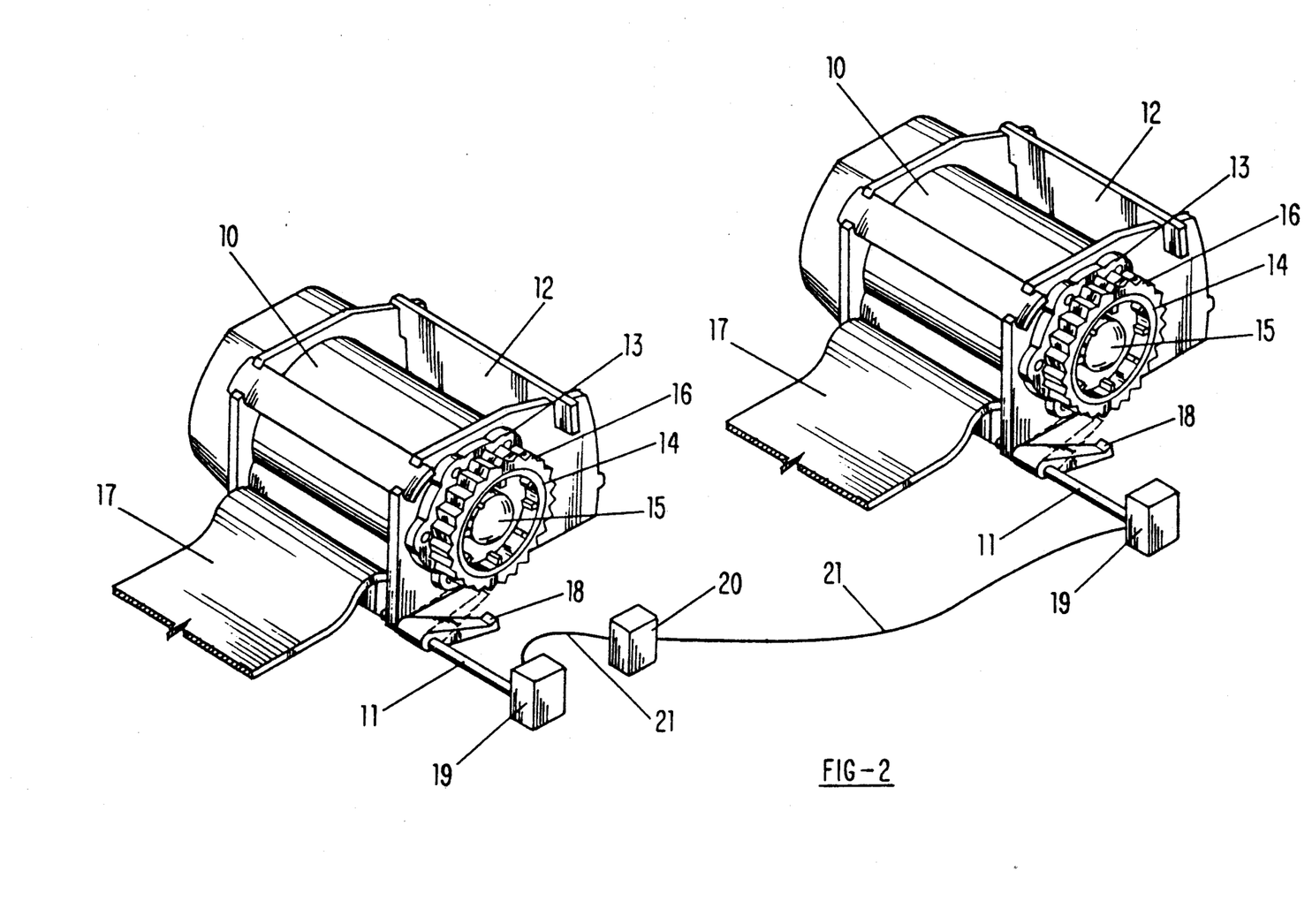
FIG. 2 shows two belt reeling devices operated independently and coupled to a computer

FIG. 2 shows an embodiment of the present invention in which two safety belt reeling devices 10 are connected to the on-board computer 20 so that they are simultaneously controllable by the on-board computer 20. For this purpose, each of the reeling devices 10 is provided with a servo-member 19 for turning the rotatable spindle 11 whereby each of the servo-members 19 is connected to the on-board computer via a respective signal line 21. When the on-board computer 20 determines that the acceleration and deceleration forces calculated based on the provided input signal surpass the preset limits stored in the on-board computer, the on-board computer 20 sends a signal to the respective servo-members 19 of the coordinated safety belt reeling devices 10 so that each servo-member 19 turns the respective spindle 11 and thereby pivots the respective lever 18 into the blocking position.

Figure 3:
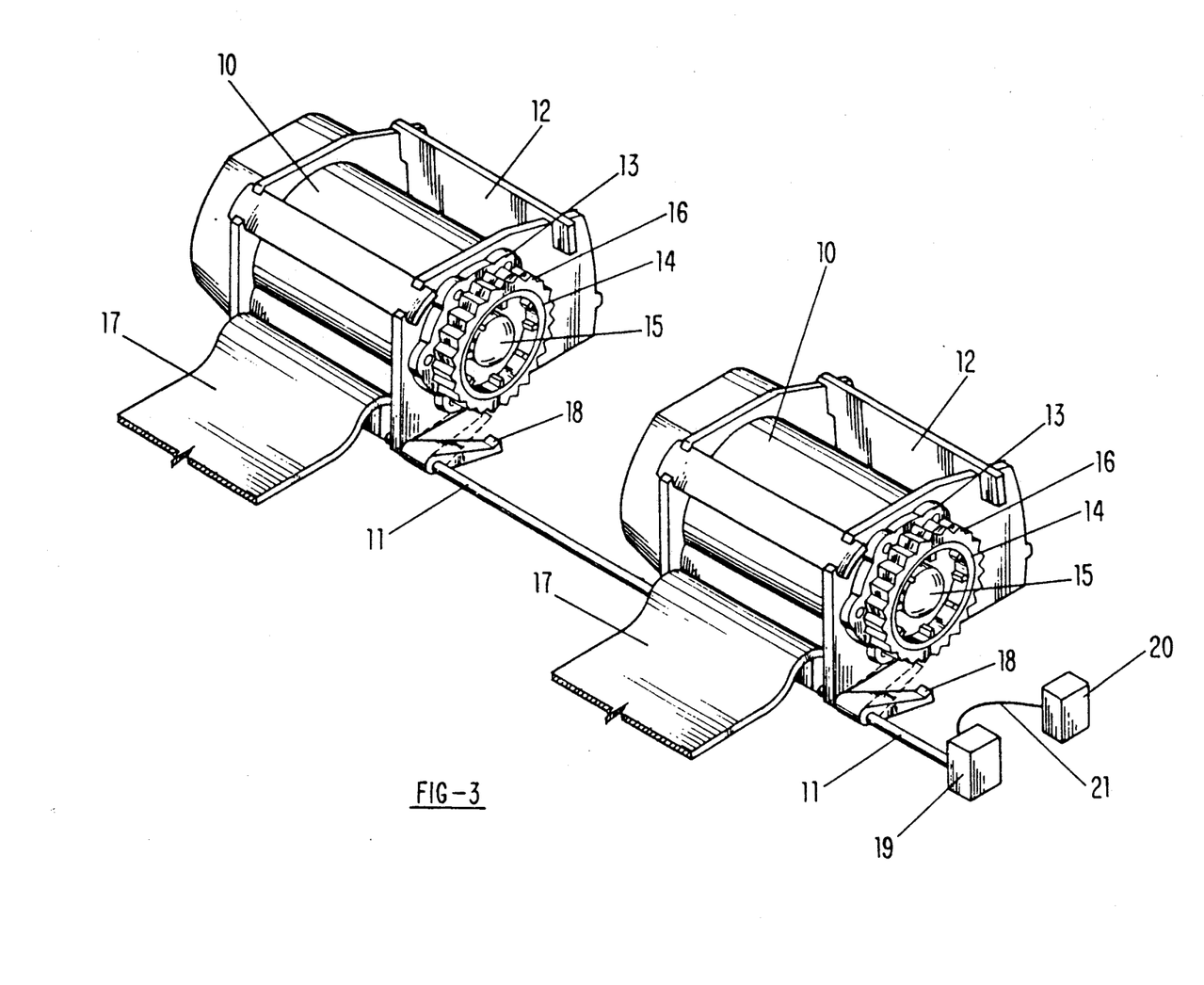
FIG. 3 shows an arrangement of two safety belt reeling devices that are interconnected by a spindle which is activatable by a servo-member.

FIG. 3 demonstrates the coupling of two safety belt reeling devices 10 to an on-board computer 20 whereby the two reeling devices 10 are interconnected via a single flexible spindle 11a to the only servo-member 19 and via the signal line 21 to the on-board computer 20. The single spindle 11a is provided with respective levers 18 coordinated with the respective safety belt reeling devices 10 so that upon a signal of the on-board computer 20 sent via the signal line 21 to the servo-device 19 the single spindle 11a is turned and a plurality of levers, in the shown example two levers 18, are pivoted into the blocking position and block the coordinated blocking mechanism of a respective safety belt reeling device 10.

Figure 4:
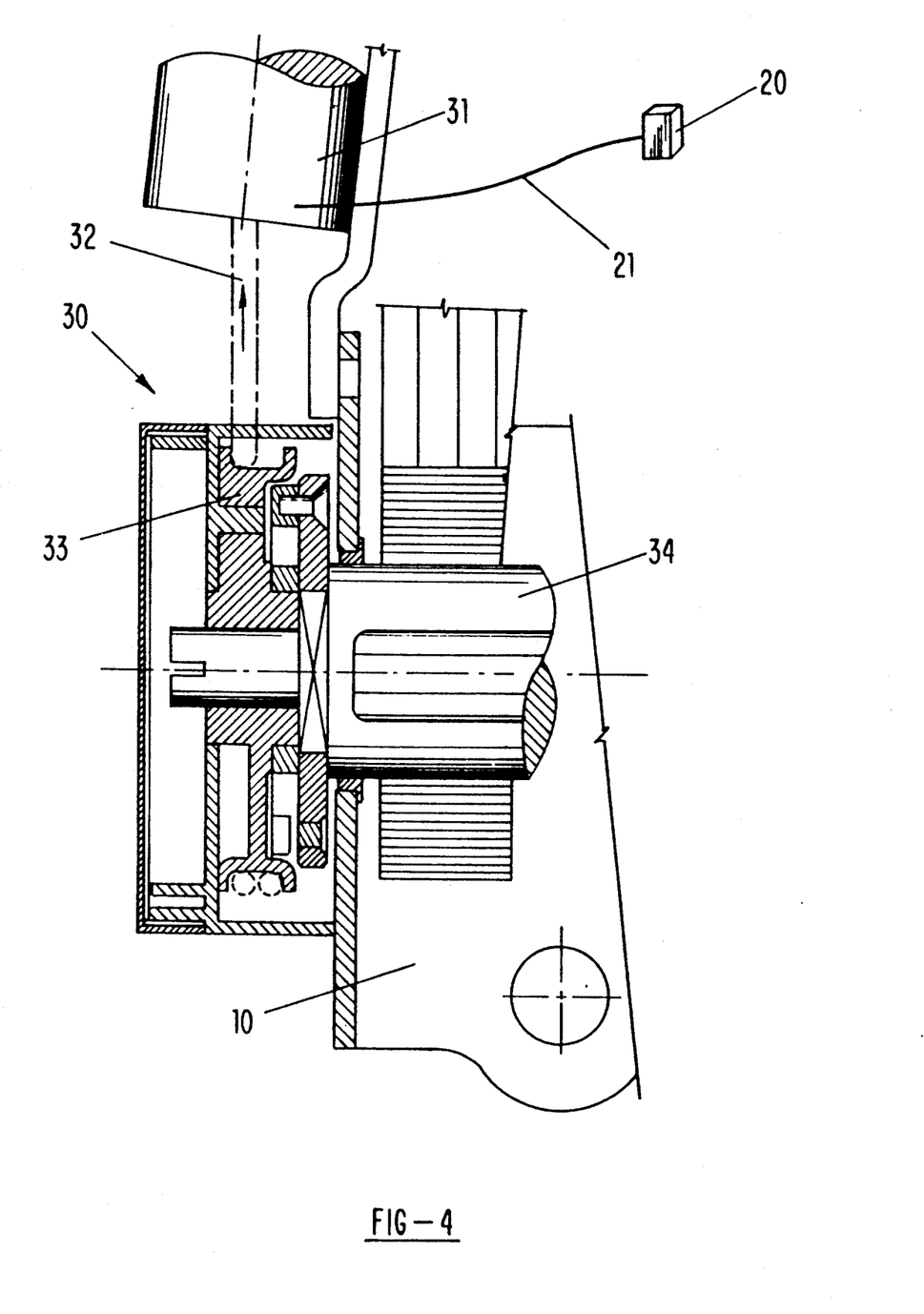
FIG. 4 demonstrates the use of the inventive arrangement for a safety belt reeling device with a tightening mechanism.

In FIG. 4 a safety belt reeling device 10 with a tightening mechanism as described in U.S. Pat. No. 4,618,108, the disclosure of which is hereby incorporated by reference, is illustrated. Details may be taken from the cited patent. The cylinder 31 is provided with a piston (not represented in the drawing) which is actuatable with a pyrotechnical propellant charge that is accommodated within the cylinder 31. The piston is connected to a cable 32 which is guided about a cable pulley 33. The cable pulley 33 is connected via a coupling (described in detail in U.S. Pat. No. 4,618,108) to the shaft 34 of the reeling device 10 in order to effect the tightening action. The pyrotechnical propellant charge is connected via the signal line 21 to the on-board computer 20. When the computer 20 calculates that the preset acceleration and deceleration limits will be exceeded, a signal is emitted by the computer thereby igniting the propellant charge. The piston is then moved within the cylinder 31 so that the cable is reeled off the cable pulley 33, and via the aforementioned coupling the shaft 34 of the reeling device is also set in rotation. Accordingly, the safety belt is wound onto the reeling device and tightened. This action is initiated by the on-board computer before the acceleration and deceleration forces, precalculated by the computer based on the driving of flying commands, actually act on the vehicle.

Figure 5:
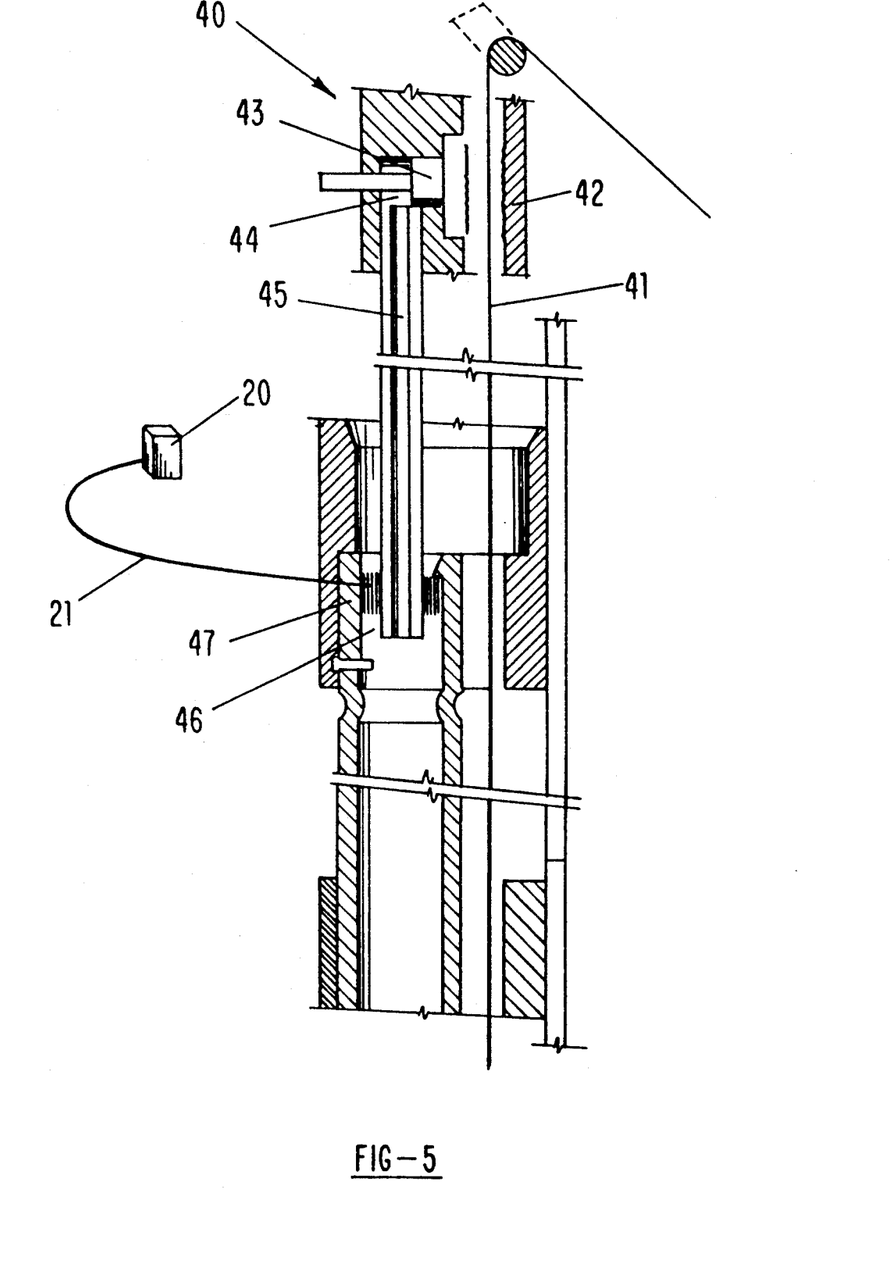
FIG. 5 shows the application of the inventive arrangement in a safety belt reeling device with a clamping mechanism.

FIG. 5 shows the combination of the on-board computer 20 with a clamping mechanism 40 for a safety belt 41. Details of the design and function of clamping device 40 may be taken from U.S. Pat. No. 4,615,540, the disclosure of which is hereby incorporated by reference. According to the cited patent the clamping device 40 is provided with a stationary clamping jaw 42 and a movable clamping jaw 43 between which the safety belt 41 is guided and clamped upon actuation of the movable clamping jaw 43. The movable clamping jaw 43 is guided within a cylinder 44 which is connected via a gas line 45 to a further cylinder 46 in which a pyrotechnical propellant charge 47 is disposed. When the propellant charge 47 is ignited the evolving gases flow via the gas line 45 into the cylinder 44 and force the movable clamping jaw 43 against the stationary clamping jaw 42. The pyrotechnical propellant charge 47 is connected via the signal line 21 to the on-board computer 20. According to the present invention, when the computer calculates that the acceleration and deceleration forces will exceed the preset limits, a signal is emitted to the propellant charge 47 by the computer 20 thereby igniting the charge 47. The evolving propellant gases press the movable clamping jaw 43 against the stationary clamping jaw 42 and cause the clamping of the safety belt 41 before the acceleration and deceleration forces that have been precalculated by the computer actually occur and act on the vehicle.

The present invention is, of course, in no way restricted to the specific disclosure of the specification and drawing, but also encompasses any modifications within the scope of the appended claims.

What we claim is:

1. In a safety belt arrangement, for use in land vehicles and aircraft for securing the occupants thereof, including at least one belt-reeling device with a self-locking blocking mechanism with control means for activating a blocking position that prevents the belt from being pulled out further, the improvement wherein:

an on-board computer is provided for determining acceleration and deceleration forces of said vehicle and aircraft by calculating said acceleration and deceleration forces by taking values based on operating commands, so that for movements of said vehicle and aircraft initiated by an operator said acceleration and deceleration forces are calculated before actually occurring and can be used as measurements for controlling said self-locking blocking mechanism, with said on-board computer being coupled to said control means of said belt reeling device, said control means activating said blocking position and returning said blocking mechanism to a rest position in response to a signal produced by said on-board computer based on said measurements.

2. A safety belt arrangement according to claim 1, further comprising a servo-member, a signal line, and a flexible spindle having a lever connected thereto, said signal line connecting said on-board computer to said servo-member and said spindle being connected to said servo-member, with said servo-member turning said spindle in response to a signal produced by said on-board computer thereby pivoting said lever into engagement with said self-locking blocking mechanism to reach said blocking position.

3. A safety belt arrangement according to claim 1, wherein a plurality of belt reeling devices are arranged to operate independently of one another; and further comprising:
- a plurality of separate control lines, said reeling devices each being coupled to said on-board computer via a respective one of said separate control lines.

4. A safety belt arrangement according to claim 1, wherein a plurality of belt reeling devices is provided; and further comprising:
- a servo-member connected to said on-board computer; and
- a transmission member in the form of a spindle, said spindle being connected to said servo member and said belt reeling devices being connected to one another by said transmission member.

5. A safety belt arrangement according to claim 1, further comprising a tightening mechanism for acting on a winding spindle of said belt reeling device to tighten the belt to restrain the body of an occupant, with an actuating element for said tightening mechanism being coupled to said on-board computer.

6. A safety belt arrangement according to claim 1, further comprising a clamping device which causes the belt to be clamped in the event of actuation, with an actuating element for said clamping device being coupled to said on-board computer.

* * * * *